US006780535B2

United States Patent
Meguriya et al.

(10) Patent No.: US 6,780,535 B2
(45) Date of Patent: Aug. 24, 2004

(54) POLYMER ELECTROLYTE FUEL-CELL SEPARATOR SEALING RUBBER COMPOSITION

(75) Inventors: Noriyuki Meguriya, Gunma-ken (JP); Yujiro Taira, Gunma-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 10/291,629

(22) Filed: Nov. 12, 2002

(65) Prior Publication Data

US 2003/0138646 A1 Jul. 24, 2003

(30) Foreign Application Priority Data

Nov. 12, 2001 (JP) ........................................ 2001-345845
Feb. 28, 2002 (JP) ........................................ 2002-052812

(51) Int. Cl.⁷ .......................... H01M 2/08; B32B 15/06; B32B 15/08; B32B 9/04
(52) U.S. Cl. ............................ 429/36; 429/34; 429/35; 428/332; 428/339; 428/447; 428/450
(58) Field of Search .................... 524/860, 861, 524/862, 865, 866; 428/446, 447, 448, 450, 332, 339; 429/34, 35, 36

(56) References Cited

U.S. PATENT DOCUMENTS

| 5,516,838 | A | * | 5/1996 | Fujiki et al. ................. 524/711 |
| 6,153,326 | A | | 11/2000 | Matsukawa et al. |
| 6,251,990 | B1 | * | 6/2001 | Meguriya et al. ............ 524/862 |
| 2002/0187385 | A1 | * | 12/2002 | Meguriya et al. ............. 429/36 |
| 2003/0032753 | A1 | * | 2/2003 | Meguriya et al. ............. 528/10 |
| 2003/0072988 | A1 | * | 4/2003 | Frisch et al. .................. 429/36 |

FOREIGN PATENT DOCUMENTS

| JP | 2000-920 A | 1/2000 |
| JP | 2000-33630 A | 2/2000 |
| JP | 2000-48832 A | 2/2000 |
| JP | 2000-62086 A | 2/2000 |
| JP | 2000-70084 A | 3/2000 |
| JP | 2000-133290 A | 5/2000 |
| JP | 2000-156215 A | 6/2000 |
| JP | 2000-176962 A | 6/2000 |
| JP | 2000-188118 A | 7/2000 |
| JP | 2000-231927 A | 8/2000 |
| JP | 2001-199002 A | 7/2001 |
| JP | 2001-216979 A | 8/2001 |

* cited by examiner

Primary Examiner—Philip Tucker
Assistant Examiner—Michael J Feely
(74) Attorney, Agent, or Firm—Birch, Stewart, Kolasch & Birch, LLP

(57) ABSTRACT

A rubber composition contains an organopolysiloxane having at least two alkenyl radicals, an organohydrogenpolysiloxane having at least three Si—H radicals, a catalyst and optionally, fumed silica and an acid resistant inorganic filler. On a periphery of one side of a polymer electrolyte fuel-cell separator, the composition forms a seal member which allows for little leaching of non-functional organopolysiloxane fraction and has improved acid resistance and compression set.

14 Claims, 1 Drawing Sheet

POLYMER ELECTROLYTE FUEL-CELL SEPARATOR SEALING RUBBER COMPOSITION

This invention relates to a sealing rubber composition for use with separators in polymer electrolyte fuel cells which are typical small size fuel cells, a seal member formed from the rubber composition, and a polymer electrolyte fuel cell separator.

BACKGROUND OF THE INVENTION

Fuel cells have the great advantages that there is in a substantial sense no need for the fossil fuel which requires to pay attention to the depletion of resource, no or little noise is produced upon power generation, and the recovery of energy is high as compared with other energy power generation devices. The construction of fuel cells as relatively small size power generation plants installed in buildings and factories has been under development and some are used in practice. In particular, polymer electrolyte fuel cells operate at low temperature as compared with other types of fuel cell. They eliminate in a material aspect a concern about the corrosion of cell constituent parts and can discharge a relatively high current flow for low-temperature operation. They are thus of great interest not only as household cogeneration devices, but also as substitute power supplies for internal combustion engines on vehicles.

The polymer electrolyte fuel cells are constructed of several components including a separator which is generally in the form of a plate having a plurality of parallel channels in one or both surfaces thereof. The separator plays the roles of conducting to the exterior the electricity generated on the gas diffusing electrode within the fuel cell, discharging the water formed in the channels during the electricity generation process and maintaining the channels as a flowpath for reactant gas to flow into the fuel cell. The fuel-cell separators are required to be reduced in size. Additionally, since a plurality of separators are used in stack, there is a need for a separator sealing material which remains fully durable in long-term service.

As the separator seal, sealing materials based on various resins have been under study in the art. Sealing materials based on silicone rubber are often employed for their moldability, heat resistance and elasticity. Typical silicone rubbers are cured products of silicone rubber compositions of the addition curing type which are more effectively moldable. These silicone rubbers generally contain non-functional oligomers, also known as low molecular weight siloxanes, which can leach out to raise a problem. When the separator is cooled with a coolant such as water or a mixture of water and ethylene glycol, low molecular weight siloxanes are leached out in the coolant. The negative influence of this leaching becomes a concern, especially for automotive and home use.

Another drawback is that silicone rubber may have insufficient chemical resistance. In the application of sealing polymer electrolyte fuel-cell separators where the seals are always in contact with acidic gases, the silicone rubber can be degraded and increased in compression set.

SUMMARY OF THE INVENTION

An object of the invention is to provide a sealing rubber composition for use with polymer electrolyte fuel-cell separators, which forms a seal member featuring little or no leaching of low molecular weight organopolysiloxanes having a degree of polymerization of up to 10, especially non-functional organopolysiloxanes having a degree of polymerization of up to 10 which can be readily leached in water or a mixture of water and ethylene glycol; a seal member formed from the rubber composition; and a polymer electrolyte fuel cell separator.

Another object of the invention is to provide a rubber composition for use in sealing of polymer electrolyte fuel-cell separators, which composition comprises siloxane bonds, fumed silica for reinforcement and an acid resistant filler and has improved acid resistance and minimized compression set; a seal member formed from the rubber composition; and a polymer electrolyte fuel cell separator.

It has been found that a rubber composition comprising (A) an organopolysiloxane having at least two alkenyl radicals per molecule, (B) an organohydrogenpolysiloxane having at least three Si—H radicals per molecule, and (E) an addition reaction catalyst, wherein the content of low molecular weight organopolysiloxanes is minimized is useful to form a seal member for a polymer electrolyte fuel-cell separator because the seal member allows for little or no leaching of low molecular weight organopolysiloxanes.

It has also been found that a rubber composition comprising components (A), (B) and (E) as described above, (C) fumed silica and (D) an acid resistant inorganic filler is useful to form a seal member for a polymer electrolyte fuel-cell separator because the seal member has improved acid resistance and minimized compression set.

Specifically, a first embodiment of the invention provides a rubber composition for sealing a periphery of at least one side of a polymer electrolyte fuel-cell separator, comprising (A) 100 parts by weight of an organopolysiloxane having at least two alkenyl radicals each bonded to a silicon atom per molecule, (B) 0.5 to 20 parts by weight of an organohydrogenpolysiloxane having at least three hydrogen atoms each bonded to a silicon atom per molecule, and (E) a catalytic amount of an addition reaction catalyst, wherein the content of low molecular weight organopolysiloxanes having a degree of polymerization of up to 10 is up to 0.2% by weight.

A second embodiment of the invention provides a rubber composition for sealing a periphery of at least one side of a polymer electrolyte fuel-cell separator, comprising (A) 100 parts by weight of an organopolysiloxane having at least two alkenyl radicals each bonded to a silicon atom per molecule, (B) 0.5 to 20 parts by weight of an organohydrogenpolysiloxane having at least three hydrogen atoms each bonded to a silicon atom per molecule, (C) 5 to 40 parts by weight of fumed silica having a specific surface area of 50 to 400 $m^2/g$, (D) 10 to 200 parts by weight of an acid resistant inorganic filler other than fumed silica having an average particle size of up to 50 $\mu m$, and (E) a catalytic amount of an addition reaction catalyst.

In a preferred embodiment of the polymer electrolyte fuel-cell separator sealing rubber compositions, the organopolysiloxane (A) has an average degree of polymerization of 100 to 2,000, and at least 90 mol % of the entire organic radicals bonded to silicon atoms are methyl. Also preferably, the total amount of alkenyl radicals in component (A) and the total amount of silicon-bonded hydrogen atoms (i.e., Si—H radicals) in component (B) are such that the molar ratio of silicon-bonded hydrogen atoms to alkenyl radicals is in a range from 0.8/1 to 5.0/1.

The acid resistant inorganic filler (D) is typically selected from among quartz flour, diatomaceous earth, mica, talc, clay, alumina, aluminum hydroxide, barium sulfate, titanium oxide, and iron oxide and mixtures thereof.

In a further aspect, the invention provides a seal member for a polymer electrolyte fuel-cell separator, comprising the rubber composition in the cured state.

In a still further aspect, the invention provides a polymer electrolyte fuel-cell separator comprising a metal plate or a substrate including an electrically conductive powder and a binder, and a seal member formed along a periphery on at least one side of the metal plate or substrate by compression molding, casting, injection molding, transfer molding, dipping, coating or screen printing the rubber composition, and curing thereto.

DESCRIPTION OF THE PREFERRED EMBODIMENTS

Figure 1:
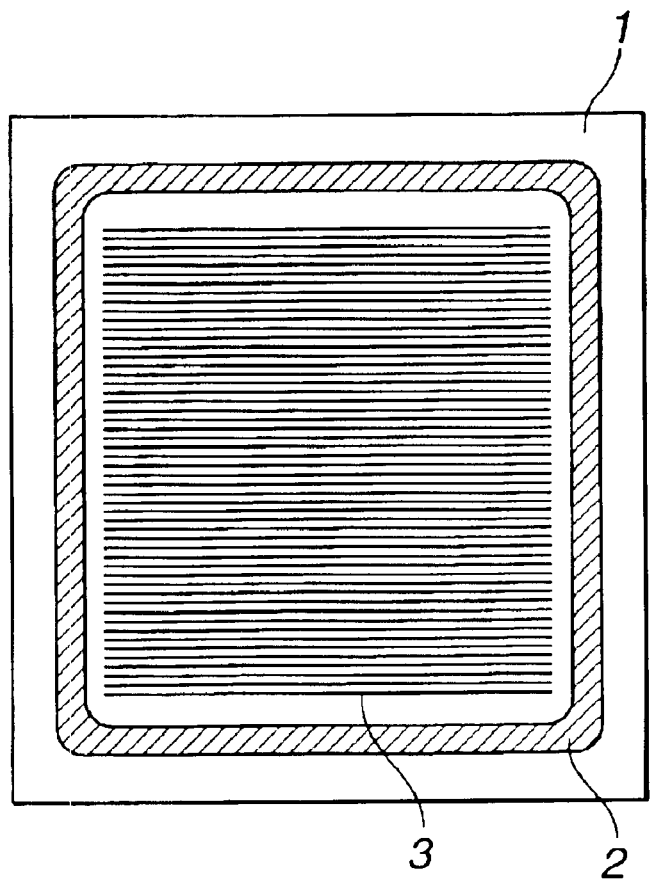
FIG. 1 is a plan view of one exemplary polymer electrolyte fuel-cell separator according to the invention.

In the rubber compositions according to the first and second embodiments of the invention, component (A) is an organopolysiloxane having at least two alkenyl radicals each bonded to a silicon atom per molecule. The organopolysiloxane used herein typically has the following average compositional formula (I):

$$R^1_a SiO_{(4-a)/2} \tag{I}$$

wherein $R^1$ is a substituted or unsubstituted monovalent hydrocarbon radical having 1 to 10 carbon atoms, preferably 1 to 8 carbon atoms, and may be the same or different, and "a" is a positive number of 1.5 to 2.8, preferably 1.8 to 2.5, more preferably 1.8 to 2.2, and most preferably 1.95 to 2.05.

Examples of the substituted or unsubstituted monovalent hydrocarbon radicals represented by $R^1$ include alkyl radicals such as methyl, ethyl, propyl, isopropyl, butyl, isobutyl, tert-butyl, pentyl, neopentyl, hexyl, cyclohexyl, octyl, nonyl and decyl; aryl radicals such as phenyl, tolyl, xylyl and naphthyl; aralkyl radicals such as benzyl, phenylethyl and phenylpropyl; alkenyl radicals such as vinyl, allyl, propenyl, isopropenyl, butenyl, hexenyl, cyclohexenyl and octenyl; as well as substituted radicals in which some or all of the hydrogen atoms on the foregoing are replaced by halogen atoms (e.g., fluoro, bromo, chloro) or cyano radicals, such as chloromethyl, chloropropyl, bromoethyl, trifluoropropyl and cyanoethyl. It is preferred that at least 90 mol % of the entire radicals $R^1$ be methyl.

It is essential that at least two of radicals $R^1$ be alkenyl radicals, preferably having 2 to 8 carbon atoms, more preferably 2 to 6 carbon atoms, and typically vinyl. The content of alkenyl radicals in the organopolysiloxane is preferably $5.0 \times 10^{-6}$ to $5.0 \times 10^{-3}$ mol/g, and more preferably $1.0 \times 10^{-5}$ to $1.0 \times 10^{-3}$ mol/g. An alkenyl radical content of less than $5.0 \times 10^{-6}$ mol/g may result in too low a rubber hardness to provide an effective seal. An alkenyl radical content in excess of $5.0 \times 10^{-3}$ mol/g may excessively increase a crosslinking density, resulting in brittle rubber.

It is understood that the alkenyl radicals may be bonded to silicon atoms at the molecular chain ends or silicon atoms midway the molecular chain or both. It is preferred that alkenyl radicals bonded to silicon atoms at the both ends of the molecular chain be included.

From the structural aspect, the organopolysiloxane preferably has a linear structure that the backbone consists of recurring diorganosiloxane units and the molecular chain is blocked at both ends with triorganosiloxy radicals. Organopolysiloxanes having a partial branched structure or cyclic structure are also acceptable. The molecular weight is not critical. Useful organopolysiloxanes may range from liquid ones having a low viscosity to gum-like ones having a high viscosity. Preferably the organopolysiloxanes have a weight-average degree of polymerization of 100 to 2,000, more preferably 150 to 2,000, even more preferably 200 to 2,000, most preferably 200 to 1,500. With a weight-average degree of polymerization of less than 100, the cured silicone rubber may become less elastic, failing to provide an effective seal. With a weight-average degree of polymerization in excess of 2,000, the silicone rubber composition may become too viscous to mold.

Component (B) in the first and second embodiments is an organohydrogenpolysiloxane having at least three hydrogen atoms each bonded to a silicon atom (i.e., Si—H radicals) per molecule. It serves as a crosslinking agent for causing the composition to cure because Si—H radicals in its molecule induce crosslinking through hydrosilylation addition reaction with silicon-bonded alkenyl radicals in component (A).

The preferred organohydrogenpolysiloxane (B) is represented by the following average compositional formula (II):

$$R^2_b H_c SiO_{(4-b-c)/2} \tag{II}$$

wherein $R^2$ is a substituted or unsubstituted monovalent hydrocarbon radical having 1 to 10 carbon atoms, preferably 1 to 8 carbon atoms, and may be the same or different, "b" is a positive number of 0.7 to 2.1, "c" is a positive number of 0.001 to 1.0, and b+c is 0.8 to 3.0, and has at least 3, usually 3 to 300, preferably 3 to 100, and more preferably 3 to 50 hydrogen atoms bonded to silicon atoms per molecule.

The substituted or unsubstituted monovalent hydrocarbon radicals represented by $R^2$ are as exemplified above for $R^1$, and preferably free of aliphatic unsaturated bonds such as alkenyl radicals. Preferably b is 0.8 to 2.0, c is 0.01 to 1.0, and b+c is 1.0 to 2.5.

With respect to the molecular structure, the organohydrogenpolysiloxane may have a straight, branched or cyclic structure or three-dimensional network structure. Preferred are those organohydrogenpolysiloxanes in which the number of silicon atoms per molecule, that is, the degree of polymerization is about 2 to about 300, preferably about 4 to about 150, and which are liquid at room temperature (25° C.) as demonstrated by a viscosity of up to about 1,000 mPa·s at 25° C., preferably about 0.1 to 500 mPa·s at 25° C.

The silicon-bonded hydrogen atoms may be located at the molecular chain ends or midway the molecular chain or both.

Examples of the organohydrogenpolysiloxane (B) include both end trimethylsiloxy radical-blocked methylhydrogenpolysiloxane, both end trimethylsiloxy radical-blocked dimethylsiloxane-methylhydrogensiloxane copolymers, both end dimethylhydrogensiloxy radical-blocked dimethylpolysiloxane, both end dimethylhydrogensiloxy radical-blocked dimethylsiloxane-methylhydrogensiloxane copolymers, both end trimethylsiloxy radical-blocked methylhydrogensiloxane-diphenylsiloxane copolymers, both end trimethylsiloxy radical-blocked methylhydrogensiloxane-diphenylsiloxane-dimethylsiloxane copolymers, copolymers composed of $(CH_3)_2HSiO_{1/2}$ units and $SiO_{4/2}$ units, and copolymers composed of $(CH_3)_2HSiO_{1/2}$ units, $SiO_{4/2}$ units, and $(C_6H_5)SiO_{3/2}$ units, as well as methylhydrogencyclopolysiloxane.

The organohydrogenpolysiloxane (B) is included in an amount of 0.5 to 20 parts by weight, preferably 0.6 to 15 parts by weight, per 100 parts by weight of component (A). More preferably, the total amount of alkenyl radicals in component (A) and the total amount of silicon-bonded hydrogen atoms (i.e., Si—H radicals) in component (B) are such that the molar ratio of Si—H radicals to alkenyl radicals is in a range from 0.8/1 to 5.0/1, and especially from 1.0/1 to 3.0/1. Whether the ratio is less than 0.8 or more than 5.0, the cured rubber may have increased compression set and an insufficient sealing ability.

Component (C) is fumed silica which is essential in the second embodiment for endowing silicone rubber with a sufficient strength and good sealing ability, though it is optional in the first embodiment. Fumed silica should have a specific surface area of 50 to 400 m$^2$/g, preferably 100 to 350 m$^2$/g, as measured by the BET method. Below 50 m$^2$/g, strength becomes insufficient. Fumed silica with a surface area of more than 400 m$^2$/g is difficult to blend with the silicone fluid and detrimental to compression set.

Fumed silica may be used as such, although fumed silica pretreated with a surface hydrophobizing agent is preferred. Alternatively, a surface treating agent is added when fumed silica is mixed with the silicone fluid whereupon the fumed silica is treated with the agent. Exemplary surface treating agents include alkylalkoxysilanes, alkylchlorosilanes, alkylsilazanes, silane coupling agents, titanate treating agents, and fatty acid esters. The surface treating agents may be used alone or two or more agents may be used at the same time or at different stages.

Fumed silica is included in an amount of up to 40 parts by weight (0 to 40 parts by weight), preferably 5 to 40 parts by weight, more preferably 10 to 35 parts by weight per 100 parts by weight of component (A). Less than 5 parts of fumed silica may be insufficient to provide satisfactory rubber strength whereas more than 40 parts of fumed silica results in increased compression set.

Component (D) is an inorganic filler which is essential in the second embodiment for endowing the rubber composition with acid resistance and low compression set, though it is optional in the first embodiment. The inorganic filler used herein, which excludes fumed silica, should have good acid resistance and an average particle size of 50 μm or less. The average particle size is preferably 20 μm or less. With an average particle size in excess of 50 μm, rubber physical properties become poor. The lower limit of average particle size is about 0.005 μm, preferably about 0.01 μm, more preferably about 0.1 μm.

It is noted that the average particle size can be determined as a weight average value (or median diameter) by means of a particle size distribution meter using laser light diffractometry or similar analysis means.

The filler should also be resistant to acid. The benefits of the invention are not achievable with less acid resistant fillers such as calcium carbonate and potassium titanate. Acid resistant fillers include, but are not limited to, quartz flour, diatomaceous earth, mica, talc, clay, alumina, aluminum hydroxide, barium sulfate, titanium oxide, and iron oxide. The filler may be mixed with the silicone fluid at room temperature or while heating. For this mixing, the filler pretreated with a surface hydrophobizing agent may be used. Alternatively, a surface treating agent is added when the filler is mixed with the silicone fluid. Exemplary surface treating agents include alkylalkoxysilanes, alkylchlorosilanes, alkylsilazanes, silane coupling agents, titanate treating agents, and fatty acid esters. The surface treating agents may be used alone or two or more agents may be used at the same time or at different stages.

The inorganic fillers may be used alone or in admixture of two or more. The filler is included in an amount of up to 200 parts by weight (0 to 200 parts by weight), preferably 10 to 200 parts by weight, more preferably 10 to 100 parts by weight per 100 parts by weight of component (A). Less than 10 parts of the filler may fail to achieve the desired effects whereas more than 200 parts of the filler is difficult to mix and detrimental to rubber physical properties.

Component (E) is an addition reaction catalyst in both the first and second embodiments. This catalyst is to induce addition reaction between alkenyl radicals in the organopolysiloxane (A) and silicon-bonded hydrogen atoms (or Si—H radicals) in the organohydrogenpolysiloxane (B). The addition reaction catalysts are most often platinum group metal catalysts including platinum catalysts such as platinum black, platinic chloride, chloroplatinic acid, the reaction products of chloroplatinic acid with monohydric alcohols, complexes of chloroplatinic acid with olefins, and platinum bisacetoacetate; palladium catalysts and rhodium catalysts. Of these, platinum catalysts are preferred.

The amount of the catalyst added is a catalytic amount capable of promoting addition reaction and usually about 0.5 ppm to 1000 ppm, especially about 1 to 500 ppm of platinum group metal based on the weight of components (A) and (B) combined. Less than 1 ppm of platinum group metal may be insufficient for addition reaction to proceed, resulting in under-curing and under-foaming. More than 1000 ppm may give little or no additional effects to the reactivity and be uneconomical.

If necessary, optional components may be included in the inventive compositions. Optional components which can be added include conductive agents such as carbon black, conductive zinc white and metal powders; hydrosilylation reaction regulating agents such as nitrogenous compounds, acetylene compounds, phosphorus compounds, nitrile compounds, carboxylates, tin compounds, mercury compounds, and sulfur compounds; heat resistance modifiers such as cerium oxide; internal parting agents such as dimethylsilicone oil; tackifiers, and thixotrophic agents.

In the first embodiment, the content of low molecular weight organopolysiloxanes having a degree of polymerization of up to 10 is preferably up to 0.2% by weight (i.e., 0 to 0.2% by weight), more preferably up to 0.15% by weight (i.e., 0 to 0.15% by weight) based on the rubber composition. Note that the degree of polymerization corresponds to the number of silicon atoms per molecule. The low molecular weight organopolysiloxanes are non-functional organopolysiloxanes which do not contain reactive radicals, such as alkenyl radicals or silicon-bonded hydrogen atoms (Si—H radicals) in the molecule, specifically those composed mainly of compounds having a structure of the following formula (III) or (IV):

(III)

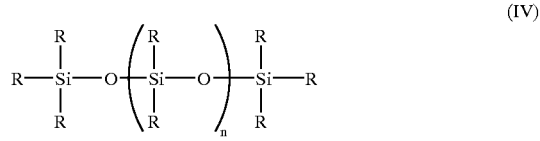

(IV)

wherein m is an integer of 3 to 10, n is an integer of 0 to 8, R is $C_1$–$C_6$ alkyl or phenyl, preferably methyl, i.e., cyclic or linear diorganopolysiloxane oligomers, and especially those composed mainly of cyclic organopolysiloxanes of formula (III), typically cyclic dimethylpolysiloxanes. When a functional or non-functional silicone fluid is prepared, these low molecular weight organopolysiloxanes are present in the silicone fluid as unreacted reactants and by-products.

Removal of low molecular weight organopolysiloxanes may be carried out by any desired method, typically a method of distilling off them by heating in vacuum. Since the organopolysiloxane (A) is rich in low molecular weight organopolysiloxanes, it is preferred to remove low molecular weight organopolysiloxanes from component (A) prior to use. The invention is not limited to this procedure. It is also acceptable to mix two or more components and remove low molecular weight organopolysiloxanes from the mixture.

The seal member of the invention is formed of the addition reaction curing type silicone rubber composition comprising the above-mentioned components in the cured state. The silicone rubber composition is molded and cured by a well-known method into a desired shape, yielding a rubber seal member for polymer electrolyte fuel-cell separators.

In forming the fuel-cell separator seal member from the cured rubber according to the invention, the silicone rubber composition is molded into a predetermined seal shape by a compression molding, casting or injection molding technique and combined with a separator. Alternatively, a seal member integrated with a separator can be formed by a dipping, coating, screen printing or insert molding technique. Appropriate curing conditions include a temperature of 100 to 300° C. and a time of 10 seconds to 30 minutes.

The base of the separator used herein is a metal thin plate or a substrate obtained by integrally molding an electrically conductive powder and a binder. A seal member is formed on the separator base by any of the foregoing techniques, yielding a polymer electrolyte fuel-cell separator.

Examples of the electrically conductive powder include natural graphite such as flake graphite, artificial graphite, and conductive carbon black such as acetylene black and Ketjen Black, but are not limited thereto. Exemplary binders include epoxy resins, phenolic resins, and rubber-modified phenolic resins.

Figure 2:
FIG. 2 is a cross-sectional view of the separator.

In the practice of the invention, the rubber composition is applied by a compression molding, casting, injection molding, transfer molding, dipping, coating or screen printing technique and cured to a peripheral portion of a separator base. Referring to FIGS. 1 and 2, there is illustrated an exemplary polymer electrolyte fuel-cell separator according to the invention. A seal portion or member 2 is formed along the periphery of a substrate 1 in a closed loop shape, by applying and curing the rubber composition of the invention. The substrate 1 is formed with gas flow channels 3.

The seal member thus formed preferably has a thickness or height of 0.1 to 2 mm as best shown in FIG. 2. A seal member of less than 0.1 mm is sometimes difficult to form and fails to provide an effective seal. A seal thickness of more than 2 mm may interfere with size reduction.

EXAMPLE

Examples of the invention are given below by way of illustration and not by way of limitation. All parts are by weight.

In the following Examples and Comparative Examples, the content of dimethylpolysiloxanes having a degree of polymerization of up to 10 (cyclic and linear dimethylpolysiloxanes combined) in the starting dimethylpolysiloxane or the content of dimethylpolysiloxanes having a degree of polymerization of up to 10 (cyclic and linear dimethylpolysiloxanes combined) in the mixture prior to addition of a platinum catalyst was determined by dissolving 1 g of a sample in 10 ml of acetone, holding the solution at room temperature for 16 hours, and analyzing the solution by gas chromatography.

The average degree of polymerization is a weight average degree of polymerization.

Example 1

A silicone rubber base was prepared by combining 68 parts of dimethylpolysiloxane (1) blocked with dimethylvinylsiloxy radicals at both ends, having an average degree of polymerization of 500 and a viscosity of 10 Pa·s at 25° C., and containing 820 ppm (0.082 wt %) of dimethylpolysiloxanes having a degree of polymerization of up to 10 with 32 parts of fumed silica having a specific surface area of 200 m$^2$/g (Aerosil 200 by Nippon Aerosil Co., Ltd.), 5 parts of hexamethyldisilazane and 2.0 parts of water, mixing them at room temperature for 30 minutes, heating the mixture at 150° C., agitating for 3 hours, and cooling.

To 100 parts of the silicone rubber base was added 40 parts of dimethylpolysiloxane (2) blocked with dimethylvinylsiloxy radicals at both ends, having an average degree of polymerization of 250, and containing 460 ppm (0.046 wt %) of dimethylpolysiloxanes having a degree of polymerization of up to 10. Agitation was continued for 30 minutes. To the mixture were added 2.2 parts of methylhydrogenpolysiloxane (3) containing Si—H radicals at both ends and side chains and having a degree of polymerization of 17 and a Si—H content of 0.0060 mol/g as the crosslinking agent (Si—H radical/vinyl radical ratio=1.5), and 0.05 part of ethynyl cyclohexanol as the reaction regulating agent. Agitation was continued for 15 minutes, giving a mixture. Analysis was made on the mixture, finding that the content of dimethylpolysiloxanes having a degree of polymerization of up to 10 was 420 ppm (0.042 wt %).

A silicone rubber composition was obtained by mixing the mixture with 0.1 part of a platinum catalyst (Pt concentration 1%). It was press cured at 120° C. for 10 minutes to form a sheet of 2 mm thick. A 10-g portion was cut from the rubber sheet and immersed in 100 g of water or ethylene glycol, which was kept at 80° C. for one week for extraction. The amount of organopolysiloxanes having a degree of polymerization of up to 10 leached out was determined by gas chromatography (based on the weight of the cured silicone rubber). The results are shown in Table 1.

The above-described dimethylpolysiloxanes (1) and (2) each were obtained by agitating a dimethylpolysiloxane product, prepared in a conventional way, at a vacuum of 0.5 mmHg and 200° C. for 10 hours for distilling off low-boiling fractions.

Example 2

A silicone rubber base was prepared by combining 68 parts of dimethylpolysiloxane (2) (used in Example 1) with 22 parts of fumed silica having a specific surface area of 130 m$^2$/g and surface hydrophobized with dimethyldichlorosilane (Aerosil R972 by Nippon Aerosil Co., Ltd.), 3 parts of hexamethyldisilazane and 2.0 parts of water, mixing them at room temperature for 30 minutes, heating the mixture at 150° C., agitating for 3 hours, and cooling.

To 90 parts of the silicone rubber base was added 50 parts of dimethylpolysiloxane (4) blocked with dimethylvinylsiloxy radicals at both ends, having an average degree of polymerization of 180, and containing 80 ppm (0.008 wt %)

of dimethylpolysiloxanes having a degree of polymerization of up to 10. Agitation was continued for 30 minutes. To the mixture were added 5.3 parts of methylhydrogenpolysiloxane (3) containing Si—H radicals at both ends and side chains and having a degree of polymerization of 17 and a Si—H content of 0.0060 mol/g as the crosslinking agent (Si—H radical/vinyl radical ratio=2.0), and 0.05 part of ethynyl cyclohexanol as the reaction regulating agent. Agitation was continued for 15 minutes, giving a mixture. Analysis was made on the mixture, finding that the content of dimethylpolysiloxanes having a degree of polymerization of up to 10 was 220 ppm (0.022 wt %).

A silicone rubber composition was obtained by mixing the mixture with 0.1 part of a platinum catalyst (Pt concentration 1%). It was press cured at 120° C. for 10 minutes to form a sheet of 2 mm thick. As in Example 1, a portion of the rubber sheet was immersed in 100 g of water or ethylene glycol, which was kept at 80° C. for one week for extraction. The amount of organopolysiloxanes having a degree of polymerization of up to 10 leached out was determined by gas chromatography. The results are shown in Table 1.

Comparative Example 1

A silicone rubber base was prepared by combining 68 parts of dimethylpolysiloxane (5) blocked with dimethylvinylsiloxy radicals at both ends, having an average degree of polymerization of 500, and containing 2500 ppm (0.25 wt %) of dimethylpolysiloxanes having a degree of polymerization of up to 10 with 32 parts of fumed silica having a specific surface area of 200 m²/g (Aerosil 200 by Nippon Aerosil Co., Ltd.), 5 parts of hexamethyldisilazane and 2.0 parts of water, mixing them at room temperature for 30 minutes, heating the mixture at 150° C., agitating for 3 hours, and cooling.

To 100 parts of the silicone rubber base was added 40 parts of dimethylpolysiloxane (6) blocked with dimethylvinylsiloxy radicals at both ends, having an average degree of polymerization of 250, and containing 3500 ppm (0.35 wt %) of dimethylpolysiloxanes having a degree of polymerization of up to 10. Agitation was continued for 30 minutes. To the mixture were added 2.2 parts of methylhydrogenpolysiloxane (3) containing Si—H radicals at both ends and side chains and having a degree of polymerization of 17 and a Si—H content of 0.0060 mol/g as the crosslinking agent (Si—H radical/vinyl radical ratio=1.5), and 0.05 part of ethynyl cyclohexanol as the reaction regulating agent. Agitation was continued for 15 minutes, giving a mixture. Analysis was made on the mixture, finding that the content of dimethylpolysiloxanes having a degree of polymerization of up to 10 was 2800 ppm (0.28 wt %).

A silicone rubber composition was obtained by mixing the mixture with 0.1 part of a platinum catalyst (Pt concentration 1%). It was press cured at 120° C. for 10 minutes to form a sheet of 2 mm thick. As in Example 1, a portion of the rubber sheet was immersed in 100 g of water or ethylene glycol, which was kept at 80° C. for one week for extraction. The amount of organopolysiloxanes having a degree of polymerization of up to 10 leached out was determined by gas chromatography. The results are shown in Table 1.

Comparative Example 2

A silicone rubber base was prepared by combining 68 parts of dimethylpolysiloxane (5) (used in Comparative Example 1) with 22 parts of fumed silica having a specific surface area of 130 m²/g and surface hydrophobized with dimethyldichlorosilane (Aerosil R972 by Nippon Aerosil Co., Ltd.), 3 parts of hexamethyldisilazane and 2.0 parts of water, mixing them at room temperature for 30 minutes, heating the mixture at 150° C., agitating for 3 hours, and cooling.

To 90 parts of the silicone rubber base was added 50 parts of dimethylpolysiloxane (7) blocked with dimethylvinylsiloxy radicals at both ends, having an average degree of polymerization of 180, and containing 4500 ppm (0.45 wt %) of dimethylpolysiloxanes having a degree of polymerization of up to 10. Agitation was continued for 30 minutes. To the mixture were added 5.3 parts of methylhydrogenpolysiloxane (3) containing Si—H radicals at both ends and side chains and having a degree of polymerization of 17 and a Si—H content of 0.0060 mol/g as the crosslinking agent (Si—H radical/vinyl radical ratio=2.0), and 0.05 part of ethynyl cyclohexanol as the reaction regulating agent. Agitation was continued for 15 minutes, giving a mixture. Analysis was made on the mixture, finding that the content of dimethylpolysiloxanes having a degree of polymerization of up to 10 was 3200 ppm (0.32 wt %).

A silicone rubber composition was obtained by mixing the mixture with 0.1 part of a platinum catalyst (Pt concentration 1%). It was press cured at 120° C. for 10 minutes to form a sheet of 2 mm thick. As in Example 1, a portion of the rubber sheet was immersed in 100 g of water or ethylene glycol, which was kept at 80° C. for one week for extraction. The amount of organopolysiloxanes having a degree of polymerization of up to 10 leached out was determined by gas chromatography. The results are shown in Table 1.

TABLE 1

| Extracting solvent (80° C./1 week) | Example 1 | Example 2 | Comparative Example 1 | Comparative Example 2 |
| --- | --- | --- | --- | --- |
| Water | ≦1 ppm | ≦1 ppm | 2 ppm | 5 ppm |
| Ethylene glycol | 3 ppm | ≦1 ppm | 12 ppm | 29 ppm |

Using the rubber compositions within the first embodiment of the invention, seal members are obtained from which a minimized amount of low molecular weight organopolysiloxanes having a degree of polymerization of up to 10 is leached out. Since the leaching of non-functional organopolysiloxanes having a degree of polymerization of up to 10 which are readily leached out in water or a mixture of water and ethylene glycol used as the coolant for the separator is minimized, the seal members are best suited to combine with polymer electrolyte fuel-cell separators.

Example 3

A silicone rubber base was prepared by combining 68 parts of dimethylpolysiloxane (1) blocked with dimethylvinylsiloxy radicals at both ends and having an average degree of polymerization of 500 with 32 parts of fumed silica having a specific surface area of 200 m²/g (Aerosil 200 by Nippon Aerosil Co., Ltd.), 5 parts of hexamethyldisilazane and 2.0 parts of water, mixing them at room temperature for 30 minutes, heating the mixture at 150° C., agitating for 3 hours, and cooling.

To 100 parts of the silicone rubber base were added 40 parts of dimethylpolysiloxane (2) blocked with dimethylvinylsiloxy radicals at both ends and having an average degree of polymerization of 250 and 50 parts of a crystalline quartz filler having an average particle size of 4 μm (Crystalite VX-S by Tatsumori Co., Ltd.). Agitation was continued for 30 minutes. To the mixture were added 2.2 parts of methylhydrogenpolysiloxane (3) containing Si—H radicals at both ends and side chains and having a degree of polymerization of 17 and a Si—H content of 0.0060 mol/g as the crosslinking agent (Si—H radical/vinyl radical ratio=1.5), and 0.05 part of ethynyl cyclohexanol as the reaction regulating agent. Agitation was continued for 15 minutes, giving a mixture.

A silicone rubber composition was obtained by mixing 100 parts of the mixture with 0.1 part of a platinum catalyst (Pt concentration 1 wt %). It was press cured at 120° C. for 10 minutes to form sheets of 1 mm and 4 mm thick. A specimen of 30 mm×30 mm cut out of the 1-mm sheet was examined for acid resistance by immersing it in a 10% aqueous sulfuric acid solution at 100° C. for 1 week and 3 weeks and calculating a weight change. A specimen of 10 mm×10 mm cut out of the 4-mm sheet was examined for compression set by compressing it 25% by means of a jig made of glass and Teflon®, immersing it in a 10% aqueous sulfuric acid solution at 100° C. for 1 week and 3 weeks and measuring compression set. The results are shown in Table 2.

Example 4

A silicone rubber base was prepared by combining 58 parts of dimethylpolysiloxane (1) blocked with dimethylvinylsiloxy radicals at both ends and having an average degree of polymerization of 500 with 22 parts of surface hydrophobized fumed silica having a specific surface area of 260 $m^2/g$ (Rheolosil DM30S by Tokuyama Co., Ltd.), 20 parts of diatomaceous earth having an average particle size of 6 μm (Oplite W-3005S by Hokushu Keisodo Co., Ltd.), 6 parts of hexamethyldisilazane and 2.0 parts of water, mixing them at room temperature for 30 minutes, heating the mixture at 150° C., agitating for 3 hours, and cooling.

To 100 parts of the silicone rubber base was added 40 parts of dimethylpolysiloxane (2) blocked with dimethylvinylsiloxy radicals at both ends and having an average degree of polymerization of 250. Agitation was continued for 30 minutes. To the mixture were added 2.4 parts of methylhydrogenpolysiloxane (3) containing Si—H radicals at both ends and side chains and having a degree of polymerization of 17 and a Si—H content of 0.0060 mol/g as the crosslinking agent (Si—H radical/vinyl radical ratio=1.8), and 0.05 part of ethynyl cyclohexanol as the reaction regulating agent. Agitation was continued for 15 minutes, giving a mixture.

A silicone rubber composition was obtained by mixing 100 parts of the mixture with 0.1 part of a platinum catalyst (Pt concentration 1 wt %). It was press cured at 120° C. for 10 minutes to form sheets of 1 mm and 4 mm thick. A weight change and compression set were measured as in Example 3, with the results shown in Table 2.

Example 5

A silicone rubber base was prepared by combining 58 parts of dimethylpolysiloxane (1) blocked with dimethylvinylsiloxy radicals at both ends and having an average degree of polymerization of 500 with 22 parts of surface hydrophobized fumed silica having a specific surface area of 180 $m^2/g$ (Aerosil R-974 by Nippon Aerosil Co., Ltd.), 20 parts of aluminum hydroxide having an average particle size of 1 μm (Higilite H42M by Showa Denko Co., Ltd.), 6 parts of hexamethyldisilazane, 3 parts of diphenylsilane diol and 2.0 parts of water, mixing them at room temperature for 30 minutes, heating the mixture at 150° C., agitating for 3 hours, and cooling.

To 100 parts of the silicone rubber base were added 40 parts of dimethylpolysiloxane (2) blocked with dimethylvinylsiloxy radicals at both ends and having an average degree of polymerization of 250 and 5 parts of titanium dioxide having a average particle size of 0.3 μm (Tipake R820 by Ishihara Industry Co., Ltd.). Agitation was continued for 30 minutes. To the mixture were added 2.8 parts of methylhydrogenpolysiloxane (3) containing Si—H radicals at both ends and side chains and having a degree of polymerization of 17 and a Si—H content of 0.0060 mol/g as the crosslinking agent (Si—H radical/vinyl radical ratio=1.8), and 0.05 part of ethynyl cyclohexanol as the reaction regulating agent. Agitation was continued for 15 minutes, giving a mixture.

A silicone rubber composition was obtained by mixing 100 parts of the mixture with 0.1 part of a platinum catalyst (Pt concentration 1 wt %). It was press cured at 120° C. for 10 minutes to form sheets of 1 mm and 4 mm thick. A weight change and compression set were measured as in Example 3, with the results shown in Table 2.

Comparative Example 3

A silicone rubber base was prepared by combining 68 parts of dimethylpolysiloxane (1) blocked with dimethylvinylsiloxy radicals at both ends and having an average degree of polymerization of 500 with 32 parts of fumed silica having a specific surface area of 200 $m^2/g$ (Aerosil 200 by Nippon Aerosil Co., Ltd.), 5 parts of hexamethyldisilazane and 2.0 parts of water, mixing them at room temperature for 30 minutes, heating the mixture at 150° C., agitating for 3 hours, and cooling.

To 100 parts of the silicone rubber base was added 50 parts of dimethylpolysiloxane (2) blocked with dimethylvinylsiloxy radicals at both ends and having an average degree of polymerization of 250. Agitation was continued for 30 minutes. To the mixture were added 2.2 parts of methylhydrogenpolysiloxane (3) containing Si—H radicals at both ends and side chains and having a degree of polymerization of 17 and a Si—H content of 0.0060 mol/g as the crosslinking agent (Si—H radical/vinyl radical ratio=1.5), and 0.05 part of ethynyl cyclohexanol as the reaction regulating agent. Agitation was continued for 15 minutes, giving a mixture.

A silicone rubber composition was obtained by mixing 100 parts of the mixture with 0.1 part of a platinum catalyst (Pt concentration 1 wt %). It was press cured at 120° C. for 10 minutes to form sheets of 1 mm and 4 mm thick. A weight change and compression set were measured as in Example 3, with the results shown in Table 2.

Comparative Example 4

A silicone rubber base was prepared by combining 58 parts of dimethylpolysiloxane (1) blocked with dimethylvinylsiloxy radicals at both ends and having an average degree of polymerization of 500 with 32 parts of surface hydrophobized fumed silica having a specific surface area of 260 $m^2/g$ (Rheolosil DM30S by Tokuyama Co., Ltd.), 6 parts of hexamethyldisilazane and 2.0 parts of water, mixing them at room temperature for 30 minutes, heating the mixture at 150° C., agitating for 3 hours, and cooling.

To 90 parts of the silicone rubber base were added 40 parts of dimethylpolysiloxane (2) blocked with dimethylvinylsiloxy radicals at both ends and having an average degree of polymerization of 250 and 20 parts of calcium carbonate having an average particle size of 3 μm (Silver W by Shiraishi Industry Co., Ltd.). Agitation was continued for 30 minutes. To the mixture were added 2.4 parts of methylhydrogenpolysiloxane (3) containing Si—H radicals at both ends and side chains and having a degree of polymerization of 17 and a Si—H content of 0.0060 mol/g as the crosslinking agent (Si—H radical/vinyl radical ratio=1.8), and 0.05 part of ethynyl cyclohexanol as the reaction regulating agent. Agitation was continued for 15 minutes, giving a mixture.

A silicone rubber composition was obtained by mixing 100 parts of the mixture with 0.1 part of a platinum catalyst (Pt concentration 1 wt %). It was press cured at 120° C. for 10 minutes to form sheets of 1 mm and 4 mm thick. A weight change and compression set were measured as in Example 3, with the results shown in Table 2.

TABLE 2

|  | Example 3 | Example 4 | Example 5 | Comparative Example 3 | Comparative Example 4 |
|---|---|---|---|---|---|
| Weight Change (%) |  |  |  |  |  |
| 1 week | −1.2 | −0.9 | −1.0 | −2.5 | −15.0 |
| 3 weeks | −3.1 | −2.5 | −2.8 | −8.5 | −28.9 |
| Compression set (%) |  |  |  |  |  |
| 1 week | 5.0 | 4.9 | 3.5 | 6.0 | 90.0 |
| 3 weeks | 11.5 | 13.0 | 12.0 | 35.0 | unmeasurable |

Using the rubber compositions of Examples 3 to 5, seal members having satisfactory acid resistance and reduced compression set are obtained. These seal members are best suited to combine with polymer electrolyte fuel-cell separators.

Japanese Patent Application Nos. 2001-345845 and 2002-052812 are incorporated herein by reference.

Reasonable modifications and variations are possible from the foregoing disclosure without departing from either the spirit or scope of the present invention as defined by the claims.

What is claimed is:

1. A polymer electrolyte fuel-cell separator comprising a metal plate, and a seal member formed along a periphery on at least one side of the metal plate by compression molding, casting, injection molding, transfer molding, dipping, coating, or screen printing a rubber composition comprising:
   (A) 100 parts by weight of an organopolysiloxane having at least two alkenyl radicals each bonded to a silicon atom per molecule,
   (B) 0.5 to 20 parts by weight of an organohydrogenpolysiloxane having at least three hydrogen atoms each bonded to a silicon atom per molecule, and
   (E) a catalytic amount of an addition reaction catalyst,
   wherein the content of low molecular weight organopolysiloxanes having a degree of polymerization of up to 10 is up to 0.2% by weight; and curing said composition.

2. A polymer electrolyte fuel-cell separator comprising a substrate including an electrically conductive powder and a binder, and a seal member formed along a periphery on at least one side of the substrate by compression molding, casting, injection molding, transfer molding, dipping, coating, or screen printing a rubber composition comprising:
   (A) 100 parts by weight of an organopolysiloxane having at least two alkenyl radicals each bonded to a silicon atom per molecule,
   (B) 0.5 to 20 parts by weight of an organohydrogenpolysiloxane having at least three hydrogen atoms each bonded to a silicon atom per molecule, and
   (E) a catalytic amount of an addition reaction catalyst,
   wherein the content of low molecular weight organopolysiloxanes having a degree of polymerization of up to 10 is up to 0.2% by weight; and curing said composition.

3. The polymer electrolyte fuel-cell separator of claim 1 or claim 2, wherein the organopolysiloxane (A) has an average degree of polymerization of 100 to 2,000, and at least 90 mol % of the entire organic radicals bonded to silicon atoms are methyl.

4. The polymer electrolyte fuel-cell separator of claim 1 or claim 2, wherein the total amount of alkenyl radicals in component (A) and the total amount of silicon-bonded hydrogen atoms in component (B) are such that the molar ratio of silicon-bonded hydrogen atoms to alkenyl radicals is in a range from 0.8 to 5.0.

5. The polymer electrolyte fuel-cell separator of claim 1 or claim 2, wherein component (A) is a dimethylpolysiloxane blocked at both ends with dimethylvinylsiloxy radicals.

6. The polymer electrolyte fuel-cell separator of claim 5, wherein component (B) provides a Si—H radical to vinyl radical ratio of 1.0/1 to 3.0/1.

7. The polymer electrolyte fuel-cell separator of claim 1 or claim 2, wherein component (E) is a platinum catalyst.

8. A polymer electrolyte fuel-cell separator comprising a metal plate, and a seal member formed along a periphery on at least one side of the metal plate by compression molding, casting, injection molding, transfer molding, dipping, coating, or screen printing a rubber composition comprising:
   (A) 100 parts by weight of an organopolysiloxane having at least two alkenyl radicals each bonded to a silicon atom per molecule,
   (B) 0.5 to 20 parts by weight of an organohydrogenpolysiloxane having at least three hydrogen atoms each bonded to a silicon atom per molecule,
   (C) 5 to 40 parts by weight of fumed silica having a specific surface area of 50 to 400 $m^2/g$,
   (D) 10 to 200 parts by weight of an acid resistant inorganic filler other than fumed silica having an average particle size of up to 50 μm, and
   (E) a catalytic amount of an addition reaction catalyst; and curing said composition.

9. A polymer electrolyte fuel-cell separator comprising a substrate including an electrically conductive powder and a binder, and a seal member formed along a periphery on at least one side of the substrate by compression molding, casting, injection molding, transfer molding, dipping, coating, or screen printing a rubber composition comprising:
   (A) 100 parts by weight of an organopolysiloxane having at least two alkenyl radicals each bonded to a silicon atom per molecule,
   (B) 0.5 to 20 parts by weight of an organohydrogenpolysiloxane having at least three hydrogen atoms each bonded to a silicon atom per molecule,
   (C) 5 to 40 parts by weight of fumed silica having a specific surface area of 50 to 400
   (D) 10 to 200 parts by weight of an acid resistant inorganic filler other than fumed silica having an average particle size of up to 50 μm, and
   (E) a catalytic amount of an addition reaction catalyst; and curing said composition.

10. The polymer electrolyte fuel-cell separator of claim 8 or claim 9, wherein the acid resistant inorganic filler (D) is selected from the group consisting of quartz flour, diatomaceous earth, mica, talc, clay, alumina, aluminum hydroxide, barium sulfate, titanium oxide, and iron oxide and mixtures thereof.

11. The polymer electrolyte fuel-cell separator of claim 8 or claim 9, wherein the organopolysiloxane (A) has an average degree of polymerization of 200 to 2,000 and at least 90 mol % of the entire organic radicals bonded to silicon atoms are methyl.

12. The polymer electrolyte fuel-cell separator of claim 8 or claim 9, wherein the total amount of alkenyl radicals in component (A) and the total amount of silicon-bonded hydrogen atoms in component (B) are such that the molar ratio of silicon-bonded hydrogen atoms to alkenyl radicals is in a range from 0.8 to 5.0.

13. The polymer electrolyte fuel-cell separator of claim 8 or claim 9, wherein component (C) has a specific surface area of 100 to 350 m$^2$/g.

14. The polymer electrolyte fuel-cell separator of claim 8 or claim 9, wherein component (D) has an average particle size of 0.1 μm to 20 μm.

* * * * *